(12) United States Patent
Haines

(10) Patent No.: US 6,947,155 B2
(45) Date of Patent: Sep. 20, 2005

(54) REORDER ASSISTANCE NOTIFICATION INTERACTION AND METHOD

(75) Inventor: Robert E. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

(21) Appl. No.: 09/733,453

(22) Filed: Dec. 8, 2000

(65) Prior Publication Data

US 2002/0071133 A1 Jun. 13, 2002

(51) Int. Cl.[7] .............................................. G06F 15/00
(52) U.S. Cl. ......................... 358/1.14; 358/1.15; 399/8; 399/12; 399/24
(58) Field of Search ........................... 358/1.1, 1.4, 1.9, 358/1.12, 1.13, 1.14, 1.15, 502; 399/8, 9, 11, 12, 24; 299/27

(56) References Cited

U.S. PATENT DOCUMENTS

| | | | | |
|---|---|---|---|---|
| 5,305,199 A | * | 4/1994 | LoBiondo et al. | 705/28 |
| 5,657,390 A | | 8/1997 | Elgamal et al. | 380/49 |
| 6,023,593 A | * | 2/2000 | Tomidokoro | 399/8 |
| 6,028,674 A | | 2/2000 | Tognazzini | |
| 6,073,137 A | | 6/2000 | Brown et al. | 707/104 |
| 6,081,900 A | | 6/2000 | Subramaniam et al. | 713/201 |
| 6,125,369 A | | 9/2000 | Wu et al. | 707/201 |
| 6,529,692 B1 | * | 3/2003 | Haines et al. | 399/27 |
| 6,629,134 B2 | * | 9/2003 | Hayward et al. | 709/217 |
| 6,681,349 B2 | * | 1/2004 | Sekizawa | 714/47 |
| 2003/0112457 A1 | * | 6/2003 | Akiyama et al. | 358/1.14 |

FOREIGN PATENT DOCUMENTS

| | | |
|---|---|---|
| JP | 63058553 A | 3/1988 |
| WO | WO02/31741 A1 | 4/2002 |

OTHER PUBLICATIONS

IBM Network Print Manager see especially: http://www-.printers.ibm.com/R5PSC.NSF/Web/fsnpm and also http://www.printers.ibm.com/R5PSC.NSF/Web/npm (Jul. 9, 2000).

* cited by examiner

Primary Examiner—Mark Wallerson

(57) ABSTRACT

A method of notifying an operator of an event with respect to a hard copy output engine includes detecting a status of a portion of the hard copy output engine from a sensor incorporated in the hard copy output engine and displaying, in response to detecting, a graphical user interface. The graphical user interface includes information describing the portion and the status, and includes a set of user-selectable options. The set of user-selectable options includes dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

20 Claims, 4 Drawing Sheets

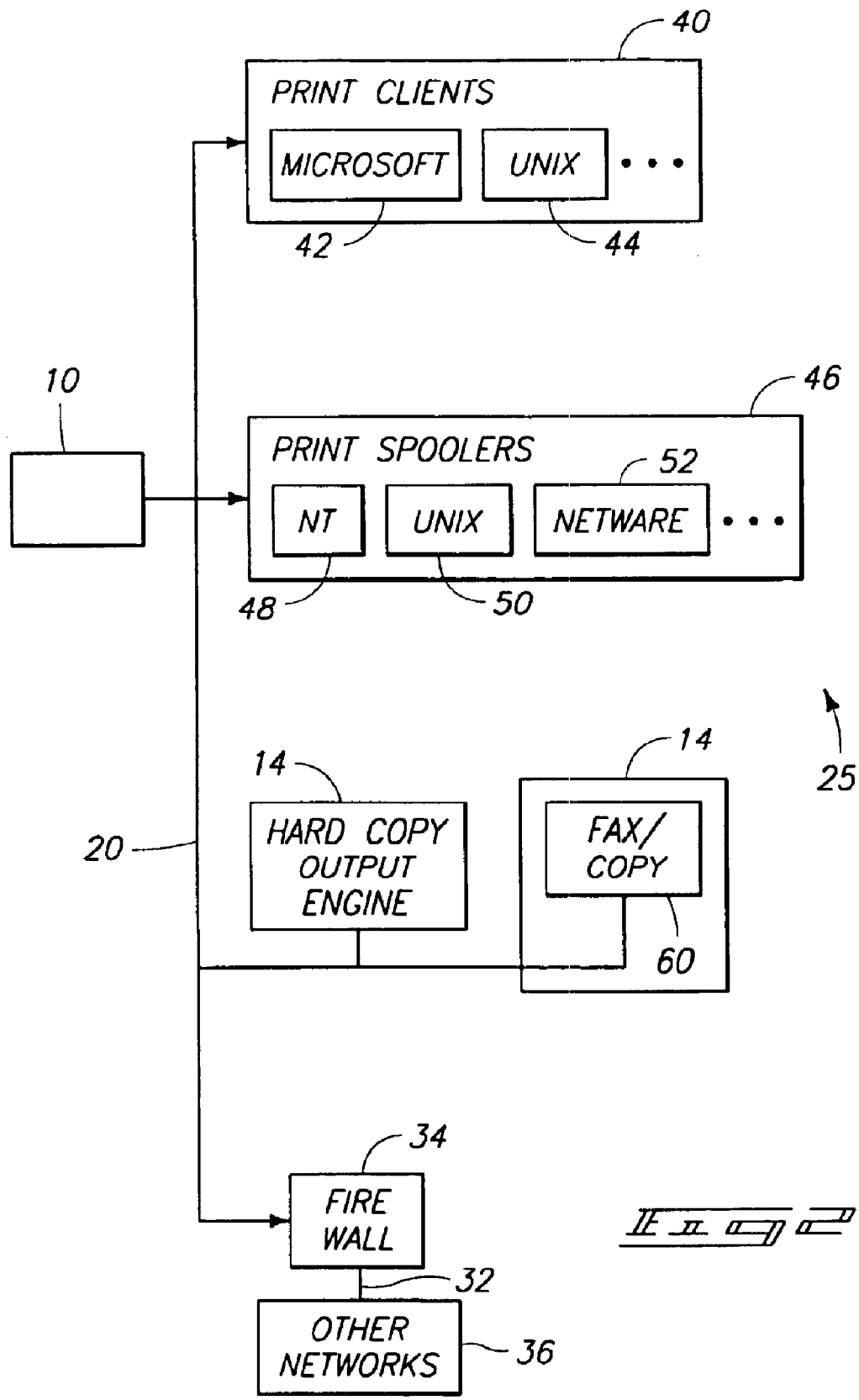

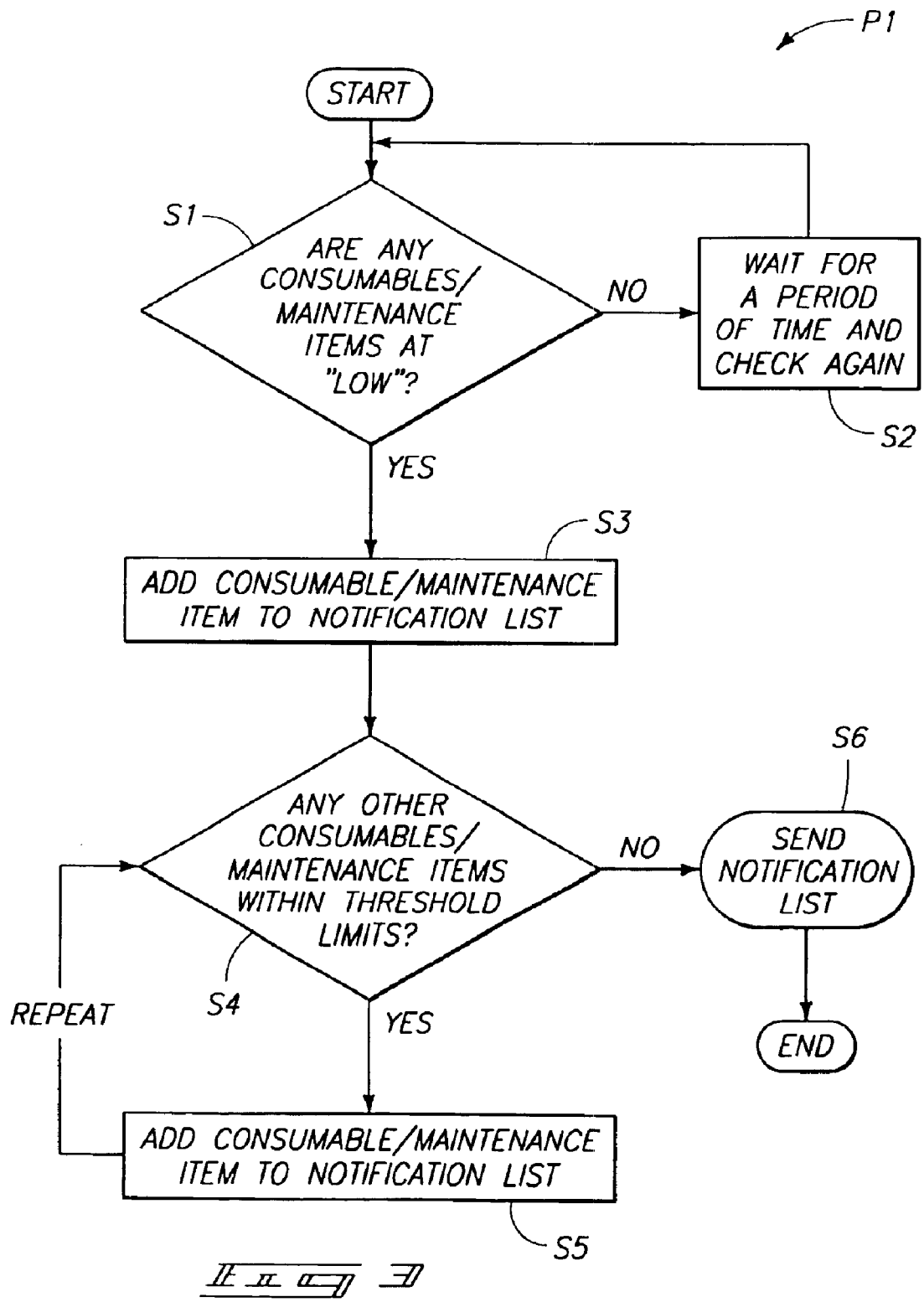

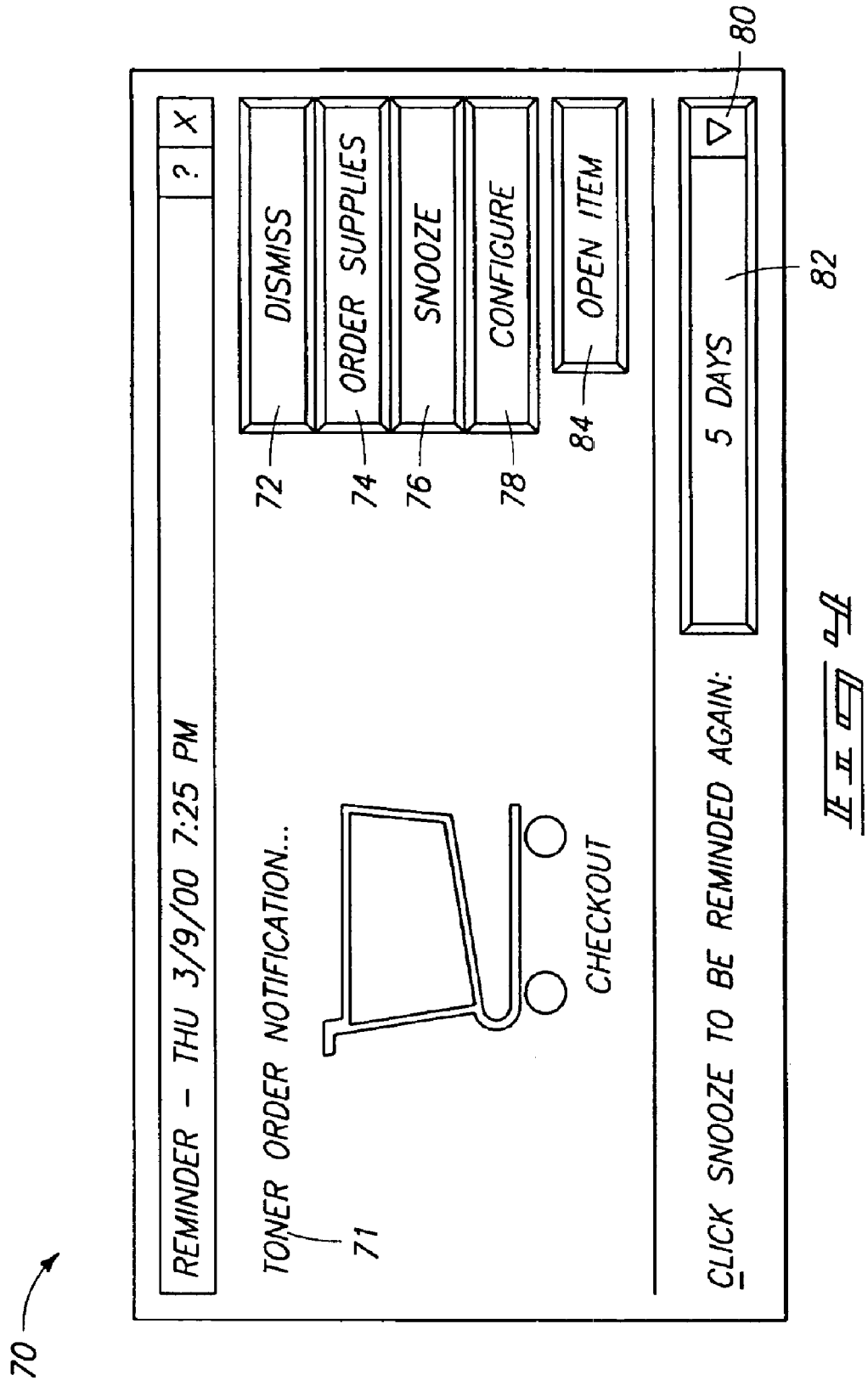

REORDER ASSISTANCE NOTIFICATION INTERACTION AND METHOD

FIELD OF THE INVENTION

The invention relates to printers and other hard copy output engines. More particularly, the invention relates to a consumables/printer management system providing indications of future needs in conjunction with providing indications of present needs.

BACKGROUND OF THE INVENTION

As computer systems and data communications systems have developed, the number and variety of hard copy output engines employed in a typical office or factory setting has grown. Examples include photo copiers, facsimile machines, printers and devices including more than one of these capabilities. In turn, this has led to a need to be able to order greater amounts of consumable supplies, some of which are specific to specific types of hard copy output engines.

As need for these types of hard copy output engines has grown, a number of different manufacturers have developed different hard copy output engines providing different operational characteristics and capabilities. While some consumable commodities associated with these devices are common to most or all such devices (e.g., standardized paper sizes), other consumable commodities, such as toners and toner supply cartridges or ink reservoirs, tend to be unique to a specific manufacturer and may be unique to a specific product line from that manufacturer. Additionally, different hard copy output engines may have different paper capacities, capabilities for accepting more or fewer paper sizes and different toner or other pigment supply requirements and capacities. Further, as hard copy output engines have been developed to provide increasing capabilities, the number of different consumable supplies utilized by the hard copy output engines has grown.

For example, hard copy output engines capable of processing jobs requiring different paper sizes need to be stocked with more than one kind or size of paper. Additionally, color printers require multiple pigmentation sources, which may be multiple ink reservoirs for liquid or solid inks, or may be multiple toners representing different primary colors.

It is generally helpful to have a mechanism for scheduling and tracking orders of consumable commodities and/or service in keeping computer systems functional. For example, it is extremely helpful to ensure that adequate supplies of replacement paper and toner or ink are available when needed.

Coordination of orders for supplies can be very helpful to avoid over-or under-stocking of these consumable commodities, while still achieving the benefits of economies of scale by pooling orders to service multiple hard copy output engines, especially those using at least some of the same consumable commodities. However, in many business settings, the sheer number of diverse hard copy output engines being used in different aspects or divisions of the business may lead to confusion in maintaining adequate supplies of these consumable commodities and in scheduling replacement of consumable commodities as well as scheduling preventative maintenance.

What is needed is a way to facilitate and coordinate scheduling replacement of consumable commodities, as well as scheduling preventative maintenance, for one or more hard copy output engines that are included in a network.

SUMMARY OF THE INVENTION

In accordance with an aspect of the present invention, a method of notifying an operator of an event with respect to a hard copy output engine includes detecting a status of a portion of the hard copy output engine from a sensor incorporated in the hard copy output engine and displaying, in response to detecting, a graphical user interface. The graphical user interface includes information describing the portion and the status, and includes a set of user-selectable options. The set of user-selectable options includes dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

In accordance with another aspect of the present invention, an article of manufacture includes a computer usable medium having computer readable code embodied therein. The computer readable code is configured to cause a processor to detect a status of a portion of the hard copy output engine from a sensor incorporated in the hard copy output engine and to display, in response to the status, a graphical user interface. The graphical user interface includes information to describe the portion and the status. The graphical user interface is configured to provide a set of user-selectable options including: dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

In accordance with yet another aspect of the present invention, a computer implemented control system for a hard copy output engine includes a sensor coupled to a portion of the hard copy output engine. The sensor is configured to provide a status of the portion. The system also includes a video interface and processing circuitry coupled to the sensor and to the video interface. The processing circuitry is configured to detect the status of the portion and to display via the video interface and in response to detecting, a graphical user interface. The graphical user interface is configured to provide information to describe the portion and the status, and to include a set of user-selectable options. The user-selectable options include dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

Other features and advantages of the invention will become apparent to those of ordinary skill in the art upon review of the following detailed description, claims and drawings.

DESCRIPTION OF THE DRAWINGS

FIG. 2 is a simplified block diagram of a computer network including multiple hard copy output engines, in accordance with an embodiment of the present invention.

FIG. 3 is a simplified flowchart illustrating a process, in accordance with an embodiment of the present invention.

FIG. 4 is a simplified depiction of a graphical user interface for reorder assistance notification interaction, in accordance with an embodiment of the present invention.

DETAILED DESCRIPTION OF THE INVENTION

Figure 1:
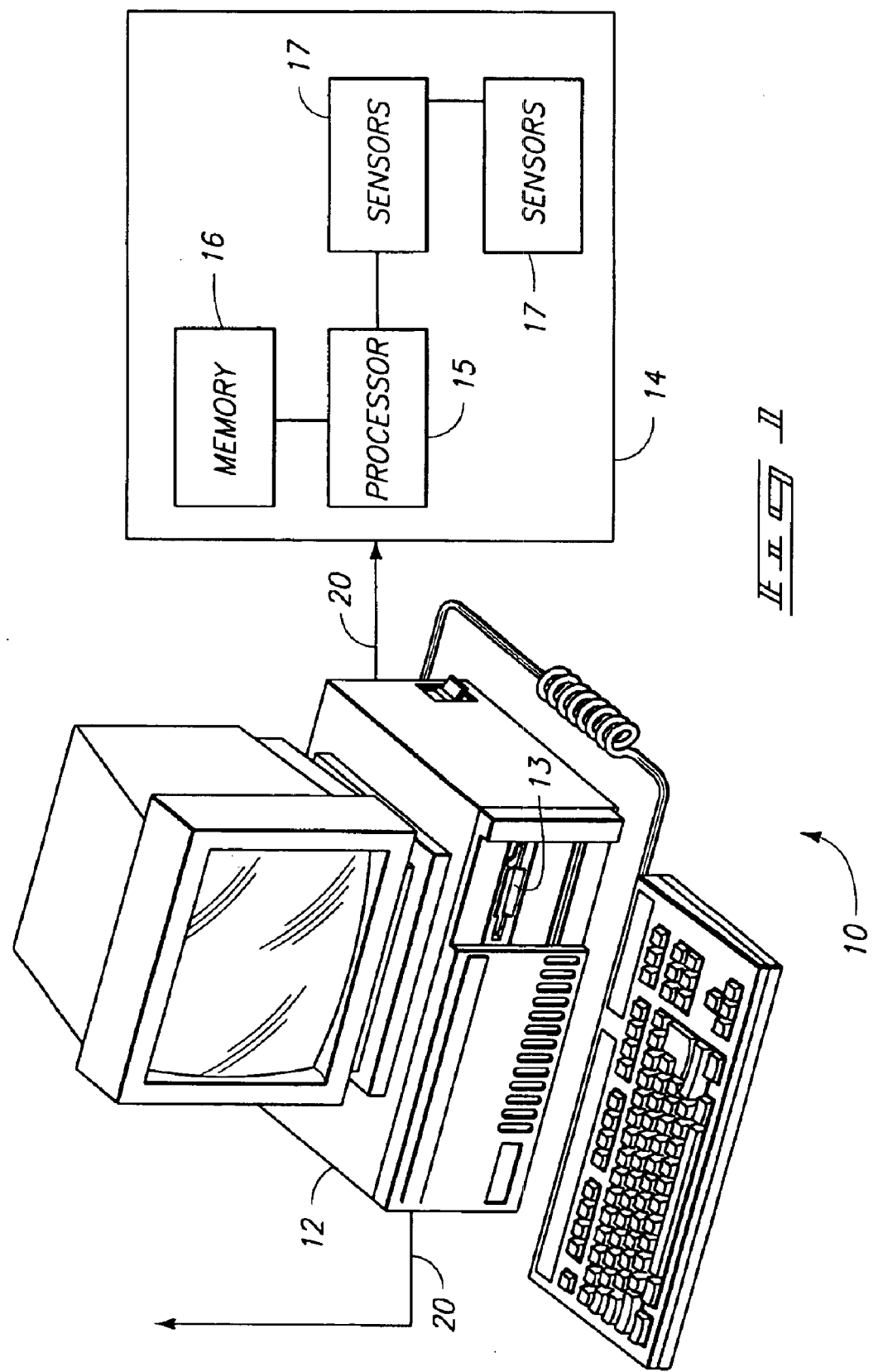
FIG. 1 is a simplified block diagram of a computer network including a computer and a hard copy output engine, in accordance with an embodiment of the present invention.

FIG. 1 is a simplified block diagram of a computer network 10 including a video display 11 coupled to a computer 12 having a floppy disc drive 13, in accordance with an embodiment of the present invention. The display 11 may comprise a conventional cathode ray tube, a liquid crystal display, and active matrix display, a field emission device display, a plasma panel display or other types of video displays useful in conjunction with the computer 12.

The network 10 also includes a hard copy output engine 14. The hard copy output engine 14 includes a controller 15, such as a conventional microprocessor or microcontroller. The hard copy output engine 14 also includes a memory 16 in data communication with the controller 15 and one or more sensors 17 coupled to the controller 15. The memory 16 is configured to embody computer readable code for configuring the processor 15 to carry out various operations and may include an electrically alterable read only memory (EAROM), electrically programmable read only memory (EPROM), a write-once, read-many memory (WORM), magnetic, magneto-optic or optical storage media, such as conventional disc storage or floppy disc data storage units, or CD-ROMs or the like, and may include read/write memory such as DRAMs or SRAMs.

The computer 12 is coupled to the hard copy output engine 14 via a data path such as a bus 20 allowing either the computer 12 or the hard copy output engine 14 to initiate data communications with the other. In one embodiment, the hard copy output engine 14 is a device such as a printer, copier, facsimile machine, or a multifunction device capable of providing two or more such functions. In one embodiment, the system 10 is coupled to other external devices (not shown in FIG. 1) via the bus 20. In one embodiment, the bus 20 includes an intranet. In one embodiment, the bus 20 includes a local area network (LAN) or wide area network (WAN). In one embodiment, the bus 20 includes access to the Internet.

In one embodiment, the computer 12 and the hard copy output engine 14 are capable of exchanging data via a protocol compatible with presence of other computers 12, hard copy output engines 14 or other devices on the bus 20. In one embodiment, the computer 12 and the hard copy output engine 14 employ an object-oriented request-reply protocol supporting asynchronous hard copy output engine query, control and monitor capabilities, and that is capable of documenting the requests, replies and data types supported by the protocol.

In one embodiment, the bus 20 provides common gateway interface (CGI) data communication capability. In one embodiment, the bus 20 includes an email capability (e.g., simple mail transfer protocol or SMTP) for facilitating data communication. In one embodiment, the bus 20 includes a secure data path using HTTP (hyper text transfer protocol) with SSL (secure sockets layer), as is described in more detail in U.S. Pat. No. 5,657,390, entitled "Secure Socket Layer Application Program Apparatus And Method", issued to Elgamal et al. and U.S. Pat. No. 6,081,900, entitled "Secure Intranet Access" and issued to Subramanian et al., which patents are hereby incorporated herein by reference for their teachings.

The sensors 17 are coupled to consumable commodities associated with the hard copy output engine 14. In one embodiment, when the sensors 17 report that a quantity of a consumable commodity (e.g., paper, toner or ink) associated with the hard copy output engine 14 has decreased to below a predetermined threshold amount, or that malfunction of a dispenser of a consumable commodity exists, the controller 15 initiates a data communication ultimately intended for transmission via the data path 20, as is described below in more detail with reference to FIG. 3. Alternatively or additionally, the sensors 17 may log hours of operation and/or loading (such as number of pages handled) in order to determine when preventive maintenance is appropriate, or may report other malfunction of the hard copy output engine 14.

The computer implemented control system and method also includes composing an electronic message including information describing the status and transmitting the electronic message. The step of composing an electronic message includes composing the electronic message to include information chosen from a list including: percentage of remaining consumable, to whom assigned, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

FIG. 2 is a simplified block diagram of a computer network or system 25 including multiple hard copy output engines 14, in accordance with an embodiment of the present invention. The network 25 of FIG. 2 includes a link 32, which may include a firewall 34, to other networks 36, which may be internal or external. The network 25 also may include print clients 40, such as Microsoft 42 and/or Unix 44, as well as others. The network 25 may further include print spoolers 46, such as NT 48, Unix 50 and/or Netware 52, as well as others. The network 25 may also include a plurality of hard copy output engines 14, which may include printers as well as facsimile/copier 60.

In one embodiment, the print clients 40 and the print spoolers 46 are coupled via the bus 20 to other data processing equipment (not shown), where the bus 20 is configured for data communication using HTTP, although other protocols may be used. In one embodiment, a different protocol, such as SNMP, is used, although other protocols may be used.

In general, it is desirable to obtain data directly from a hard copy output engine 14 because this does not require modification of the network software.

In one embodiment, the link 32 comprises an intranet. In one embodiment, the link 32 accommodates HTTP for data communication.

Providing usage and status information relative to the print clients 40, the print spoolers 46 and the individual hard copy output engines 14 can permit more effective and timely ordering of consumables and preventative maintenance for hard copy output engines 14.

FIG. 3 is a simplified flowchart illustrating a process P1, in accordance with an embodiment of the present invention. The process P1 begins in a query task S1.

In the query task S1, the processor 15 determines if any consumables/maintenance items warrant further action. In one embodiment, one of the sensors 17 of FIG. 1 detects that an amount of a consumable commodity has fallen below a predetermined level.

In one embodiment, a "toner low" or "toner out" condition may be detected. In one embodiment, the hard copy output engine 14 may have multiple toner cartridges or other pigment supplies in order to be able to provide color images.

In one embodiment, the sensor 17 may detect that preventative maintenance needs to be scheduled. In one embodiment, the sensor 17 may determine that the hard copy output engine 14 is malfunctioning, and that an appointment for a service technician needs to be scheduled.

In one embodiment, the sensor 17 detects an event such as toner out, toner low, preventative maintenance alerts, including cleaning or replacement of component parts, consumables orders and low or "out of" status for other consumables or need for other maintenance items.

When the query task S1 fails to identify that any consumables/maintenance items warrant further action, control passes to a step S2.

In the step S2, the processor 15 sets a timer to wait for a predetermined interval. When the processor determines that the predetermined interval has passed, the query task S1 is repeated.

When the query task S1 does identify that any consumables/maintenance items warrant further action, control passes to a step S3.

In the step S3, the consumable/maintenance item that warrants attention is added to a notification list. Control then passes to a query task S4.

In the query task S4, the processor 15 polls others of the sensors 17 to determine if any other consumables/maintenance items are within threshold limits of requiring further action.

When the query task S4 determines that another of the sensors 17 indicates that another consumable/maintenance item is within threshold limits of requiring further action, control passes to a step S5.

In the step S5, the another consumable/maintenance item identified in the query task S4 as being within threshold limits of requiring further action is added to the notification list that was begun in the step S3. Control then passes back to the query task S4.

When the query task S4 determines that no further consumable/maintenance items are within threshold limits, control passes to a step S6.

In the step S6, the notification list may be augmented with additional information. This information may include data allowing identification of the specific hard copy output engine 14 in which the conditions relating to the query task S1 were identified.

In the step S6, the notification list is incorporated into an electronic message, and the electronic message is transmitted. In one embodiment, the notification lists from several of the hard copy output engines 14 of FIG. 2 may be "pooled" or included together in a single electronic message to further reduce handling and shipping requirements for maintaining the hard copy output engines 14 in good operable condition. In one embodiment, the electronic message is transmitted to a URL via the Internet. In one embodiment, the electronic message is transmitted as an email.

In one embodiment, a program such as Microsoft Outlook or Microsoft Exchange, both available from Microsoft of Redmond, Wash., may be used to send electronic messages via email, for example. The operation of the Outlook email product from Microsoft (Redmond, Wash.) is described in U.S. Pat. No. 6,125,369 filed on Oct. 27, 1997, entitled "Continuous object synchronization between object stores on different computers" and issued to Charles Wu and George Hu, and in U.S. Pat. No. 6,073,137, filed on Oct. 31, 1997, entitled "Method for updating and displaying the hierarchy of a data store" and issued to Alon Brown, Scott Thurlow and Steven Wells, which patents are hereby incorporated herein by reference for their teachings.

The process P1 then ends.

In one embodiment, at least a portion of the process P1 is carried out via the processor 15. In one embodiment, at least a portion of the process P1 is carried out via the computer 12. In one embodiment, at least a portion of the process P1 is carried out via a server or exchange server.

For example, in the query task S1, one of the sensors 17 may indicate that "CYAN TONER IS LOW." Then, during a first pass, the query task S4 may determine that "MAGENTA TONER IS AT OR NEAR LOW THRESHOLD." This facilitates replacement of both the cyan toner cartridge and the magenta toner cartridge via a single order, by noting that the next toner cartridge that is likely to fail is the magenta cartridge. This provides savings in labor in shipping the cartridges and in replacing the cartridges, and also reduces the amount of time that the hard copy output engine 14 is inoperable due to being serviced.

Additionally, in another iteration of the query task S4 prior to execution of the step S6, another one of the sensors 17 may provide an indication that the "FUSER IS AT OR NEAR LOW THRESHOLD." In this instance, the electronic message may include this information, providing additional labor and cost savings in filling the order, shipping the order and in the amount of time that one or more of the hard copy engines 14 is inoperable due to being serviced.

FIG. 4 is a simplified depiction of a graphical user interface 70 for reorder assistance notification interaction, in accordance with an embodiment of the present invention. The graphical user interface 70 includes a label 71 and multiple buttons 72, 74, 76, 78, 80 and 84 and also includes a pull-down menu 82 activated by user interaction via a tactile input device such as a mouse.

When the query task S1 of FIG. 3 indicates that any consumables/maintenance items warrant further action, or when the query task S4 similarly indicates that any consumables/maintenance items warrant further action, the user may be provided with the graphical user interface 70.

The user is apprized of the nature of the consumables/maintenance items warranting further action via the label 71. In the case illustrated in FIG. 4, a need to order toner is displayed. Optionally, the graphical user interface 70 can provide information regarding where to order the item indicated by the label 71.

The graphical user interface 70 allows the user to avoid further notifications with respect to these consumables/maintenance items warranting further action by selection of the button 72, labeled "DISMISS". This selection avoids having one's thought flow altered or disturbed while engaging in tasks requiring concentration, for example.

The graphical user interface 70 also allows the user to avoid further notifications with respect to these consumables/maintenance items warranting further action by selection of the button 74, labeled "ORDER SUPPLIES". This selection causes the process P1 to proceed to the step S6 and to place an order for the consumables/maintenance items that have been identified by the query task(s) S1 and perhaps also those identified by the query task S4. This option provides assistance in automatically placing the order electronically. Items identified in the query task S4 may also be included in the order because these items are also known to be near a predetermined life-milestone.

The graphical user interface 70 also allows the user to defer further notifications with respect to these consumables/maintenance items warranting further action by selection of the button 76, labeled "SNOOZE". This selection causes the process P1 to not trigger further displays of the graphical user interface 70 with respect to the consumables/maintenance items already identified as warranting further action for an interval that is user-selectable via the button 80 and pull-down menu 82. In one embodiment, the pull-down menu 82 allows the user to select between a variety of pre-programmed "snooze" periods. In one embodiment, the pull-down menu 82 also acts as a user-writeable window in which the user may specify a chosen "snooze" period, such as "half a day" or two and one-half days" or the like.

The graphical user interface 70 also allows the user to avoid further notifications with respect to these consumables/maintenance items warranting further action by selection of the button 78, labeled "CONFIGURE". This selection allows the user to "turn off" the graphical user interface 70 so that the user does not receive further prompts regarding these consumables/maintenance items warranting further action.

In one embodiment, the graphical user interface 70 is available to the user at the order placement stage, as described above. In one embodiment, the graphical user interface 70 is available to the user at the order consolidation stage, for example, when a group of notification lists from a group of hard copy output engines 14, as shown in FIG. 2, are consolidated together prior to sending the electronic message in the step S6 of FIG. 3. In one embodiment, the graphical user interface 70 is available to the user at the order tracking stage, i.e., in tracking progress of an order to determine when a particular consumable or service that has been ordered/scheduled is expected to become available or to be performed.

The protection sought is not to be limited to the disclosed embodiments, which are given by way of example only, but instead is to be limited only by the scope of the appended claims.

What is claimed is:

1. A method of notifying an operator of an event with respect to a hard copy output engine, comprising:

detecting a status of a portion of the hard copy output engine from a sensor incorporated in the hard copy output engine; and displaying, in response to detecting, a graphical user interface including information describing the portion and the status, and including a set of user-selectable options including: dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

2. The method of claim 1, wherein detecting a status includes detecting a toner low or toner out status.

3. The method of claim 1, further comprising:

composing an electronic message including information describing the status; and transmitting the electronic message.

4. The method of claim 3, wherein composing an electronic message includes composing the electronic message to include information chosen from a list including: percentage of remaining consumable, to whom assigned, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

5. The method of claim 1, wherein detecting a status includes detecting a status from a list of status items consisting of: toner out, toner low, preventative maintenance alerts, including cleaning or replacement of component parts, consumables orders and low or "out of" status for other consumables or need for other maintenance items.

6. The method of claim 1, wherein the hard copy output engine is chosen from a group consisting of: facsimile machines, photocopiers and printers.

7. The method of claim 3, wherein transmitting the electronic message comprises transmitting an electronic message including a consumable order.

8. An article of manufacture comprising a computer usable medium having computer readable code embodied therein to cause a processor to:

detect a status of a portion of the hard copy output engine from a sensor incorporated in the hard copy output engine; and display in response to the status, a graphical user interface including information to describe the portion and the status, and to include a set of user-selectable options including: dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

9. The article of manufacture of claim 8, wherein the computer readable code configured to cause a processor to detect a status includes computer readable code configured to cause the processor to detect a toner low or toner out status.

10. The article of manufacture of claim 8, wherein the computer readable code is further configured to cause a processor to:

compose an electronic message including information describing the status; and transmit the electronic message.

11. The article of manufacture of claim 10, wherein the computer readable code configured to cause a processor to compose an electronic message includes computer readable code configured to cause the processor to compose the electronic message to include information chosen from a list including: percentage of remaining consumable, to whom assigned, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

12. The article of manufacture of claim 8, wherein the computer readable code configured to cause a processor to detect a status includes computer readable code configured to cause the processor to detect a status chosen from a list of status items consisting of: toner out, toner low, preventative maintenance alerts, including cleaning or replacement of component parts, consumables orders and low or "out of" status for other consumables or need for other maintenance items.

13. The article of manufacture of claim 8, wherein the computer readable code configured to cause a processor to detect a status comprises computer readable code configured to cause the processor to detect a status of a hard copy output engine chosen from a group consisting of: facsimile machines, photocopiers and printers.

14. The article of manufacture of claim 10, wherein the computer readable code configured to cause a processor to transmit comprises computer readable code configured to cause the processor to transmit an electronic message including a consumable order.

15. A computer implemented control system for a hard copy output engine, the system comprising:
   a sensor coupled to a portion of the hard copy output engine, the sensor being configured to provide a status of the portion;
   a video interface; and
   processing circuitry coupled to the sensor and to the video interface, the processing circuitry being configured to:
      detect the status of the portion; and
      display via the video interface and in response to the status, a graphical user interface including information to describe the portion and the status, and to include a set of user-selectable options including: dismissal of the graphical user interface, assistance in ordering consumables or services identified by the graphical user interface, deferment of action with respect to the consumables or services identified by the graphical user interface for a user-selectable interval and inhibiting further displaying of the graphical user interface.

16. The computer implemented control system of claim 15, wherein the processor configured to detect the status includes a processor configured to detect a toner low or toner out status.

17. The computer implemented control system of claim 15, wherein the processor is further configured to:
   compose an electronic message including information describing the status; and
   transmit the electronic message.

18. The computer implemented control system of claim 17, wherein the processor configured to compose an electronic message includes a processor configured to compose the electronic message to include information chosen from a list including: percentage of remaining consumable, to whom assigned, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

19. The computer implemented control system of claim 15, wherein the processor configured to detect a status includes a processor configured to detect a status chosen from a list of status items consisting of: toner out, toner low, preventative maintenance alerts, including cleaning or replacement of component parts, consumables orders and low or "out of" status for other consumables or need for other maintenance items.

20. The computer implemented control system of claim 15, wherein the processor configured to detect a status comprises a processor configured to detect a status of a hard copy output engine chosen from a group consisting of: facsimile machines, photocopiers and printers.

* * * * *